United States Patent
Song

(10) Patent No.: US 10,769,530 B2
(45) Date of Patent: Sep. 8, 2020

(54) METHOD FOR TRAINING ARTIFICIAL NEURAL NETWORK USING HISTOGRAMS AND DISTRIBUTIONS TO DEACTIVATE AT LEAST ONE HIDDEN NODE

(71) Applicant: SUALAB CO., LTD., Seoul (KR)

(72) Inventor: Kiyoung Song, Seoul (KR)

(73) Assignee: SUALAB CO., LTD., Seoul (KR)

( * ) Notice: Subject to any disclaimer, the term of this patent is extended or adjusted under 35 U.S.C. 154(b) by 64 days.

(21) Appl. No.: 16/313,870

(22) PCT Filed: Jul. 30, 2018

(86) PCT No.: PCT/KR2018/008629
§ 371 (c)(1),
(2) Date: Dec. 27, 2018

(87) PCT Pub. No.: WO2019/027208
PCT Pub. Date: Feb. 7, 2019

(65) Prior Publication Data
US 2019/0370662 A1    Dec. 5, 2019

(30) Foreign Application Priority Data

Aug. 4, 2017   (KR) .......................... 10-2017-0099139

(51) Int. Cl.
*G06N 3/08* (2006.01)
*G06N 3/04* (2006.01)

(52) U.S. Cl.
CPC ........... *G06N 3/084* (2013.01); *G06N 3/0454* (2013.01); *G06N 3/088* (2013.01)

(58) Field of Classification Search
None
See application file for complete search history.

(56) References Cited

U.S. PATENT DOCUMENTS 7,698,239 B2    4/2010  Lieuallen et al.
10,515,312 B1 *  12/2019  Kubo ....................... G06N 3/04
(Continued)

FOREIGN PATENT DOCUMENTS

KR   10-2009-0078501 A   7/2009
KR     10-1140025 B1      5/2012
(Continued)

OTHER PUBLICATIONS

Goh, P.Y., et al (2017). Reducing the complexity of an adaptive radial basis function network with a histogram algorithm. Neural Computing and Applications, 28(1), 365-78. doi:http://dx.doi.org/10.1007/s00521-016-2350-4 (Year: 2017).*

(Continued)

*Primary Examiner* — Kamran Afshar
*Assistant Examiner* — Benjamin J Buss
(74) *Attorney, Agent, or Firm* — Seed IP Law Group LLP

(57) ABSTRACT

Disclosed is a method of training at least a part of a neural network including a plurality of layers performed by a computing device according to an exemplary embodiment of the present disclosure. The method includes: inputting training data including normal data and abnormal data to an input layer of the neural network; making a feature value output from each of one or more hidden nodes of a hidden layer of the neural network for each training data into a histogram and generating a distribution of the feature value for each of the one or more hidden nodes; calculating an error between each distribution of the feature value and a predetermined probability distribution; and selecting at least one hidden node among the one or more hidden nodes of the hidden layer based on the error.

11 Claims, 7 Drawing Sheets

(56) References Cited

U.S. PATENT DOCUMENTS

2012/0150778 A1 6/2012 Kim et al.
2016/0162760 A1* 6/2016 Skaff .................. G06K 9/66
                                                                382/159

FOREIGN PATENT DOCUMENTS

| KR | 10-1568590 B1 | 11/2015 |
| KR | 10-1769918 B1 | 8/2017 |

OTHER PUBLICATIONS

Korean Notice of Allowance, dated Oct. 30, 2018, for Korean Application No. 10-2017-0099139, 2 pages. (With English Machine Translation).

Korean Office Action, dated Jul. 3, 2018, for Korean Application No. 10-2017-0099139, 8 pages. (With English Machine Translation).

Ba, "Adaptive dropout for training deep neural networks," master's thesis, University of Toronto, 2014, 33 pages.

Frazão et al., "DropAll: Generalization of Two Convolutional Neural Network Regularization Methods," *Proceedings of the 11th International Conference on Image Analysis and Recognition,* Vilamoura, Portugal, Oct. 22-24, 2014, pp. 282-289.

International Search Report, dated Oct. 23, 2018, for International Application No. PCT/KR2018/008629, 4 pages.

Lian et al., "DropConnect Regularization Method with Sparsity Constraint for Neural Networks," *Chinese Journal of Electronics* 25(1):152-158, 2016.

Wan et al., "Regularization of Neural Networks using DropConnect," *Proceedings of the 30th International Conference on Machine Learning,* Atlanta, Georgia, USA, Jun. 16-21, 2013, pp. 1058-1066.

Xiao et al., "Learning Deep Feature Representations with Domain Guided Dropout for Person Re-identification," arXiv:1604.07528v1, archived Apr. 26, 2016. (10 pages).

\* cited by examiner

METHOD FOR TRAINING ARTIFICIAL NEURAL NETWORK USING HISTOGRAMS AND DISTRIBUTIONS TO DEACTIVATE AT LEAST ONE HIDDEN NODE

BACKGROUND

Technical Field

The present disclosure relates to an artificial neural network, and more particularly, to a method of training an artificial neural network and data classification through the trained neural network.

Description of the Related Art

Pattern recognition is one field of machine learning, and means a learning of recognizing regularity of a pattern and data. A pattern recognition technology includes a supervised learning method and an unsupervised learning method. The supervised learning method means a method, in which an algorithm learns pattern recognition by using data (also referred to as "training" data), in which a result of the pattern recognition is already determined. Herein, each training data may be called labelled data. The unsupervised learning method means a method, in which an algorithm finds a pattern, which has not been known before, without labelled data.

In order to implement the pattern recognition technology, a neural network may be used. The neural network is formed of two or more nodes and links connecting the nodes. A weight may be set to each of the links, and the weight assigned to the link is variable. The weight assigned to the link may be corrected to be appropriate for performing pattern recognition intended by a neural network.

U.S. Pat. No. 7,698,239 illustrates an example of the neural network.

BRIEF SUMMARY

Technical Problem

The present disclosure is conceived in response to the background art, and provides a method of training an artificial neural network.

Technical Solution

Disclosed is a method of training at least a part of a neural network including a plurality of layers performed by a computing device according to an exemplary embodiment of the present disclosure for implementing the foregoing object. The method includes: inputting training data including normal data and abnormal data to an input layer of the neural network; making a feature value output from each of one or more hidden nodes of a hidden layer of the neural network for each training data into a histogram and generating a distribution of the feature value for each of the one or more hidden nodes; calculating an error between each distribution of the feature value and a predetermined probability distribution; and selecting at least one hidden node among the one or more hidden nodes of the hidden layer based on the error.

Alternatively, an initial weight of the neural network including the plurality of layers may be randomly determined.

Alternatively, the selecting of at least one hidden node among the one or more hidden nodes of the hidden layer based on the error may include: selecting a hidden node, in which the error is equal to or smaller than a predetermined value, among the one or more hidden nodes of the hidden layer; and updating a weight of a non-selected hidden node so that the non-selected hidden node, except for the selected hidden node, is inactivated.

Alternatively, the neural network may include at least three layers of the hidden layer.

Alternatively, the training data may not include labelling (may be unlabeled), and the training method may be an unsupervised training method.

Alternatively, the predetermined probability distribution may be a Weibull distribution, in which a parameter is randomly determined.

Alternatively, the method may further include normalizing the feature value output from the hidden layer.

Alternatively, the method may further include inputting the training data to an input layer of each of a plurality of neural networks.

Alternatively, the method may further include reconfiguring the neural network by making an ensemble one or more nodes selected from the plurality of neural networks.

According to another exemplary embodiment of the present disclosure, a computer program stored in a computer readable storage medium, the computer program including a plurality of commands executed by one or more processors of a computing device, is disclosed. The computer program may include: a command for inputting training data including normal data and abnormal data to an input layer of a neural network; a command for making a feature value output from each of one or more hidden nodes of a hidden layer of the neural network for each training data into a histogram and generating a distribution of the feature value for each of the one or more hidden nodes; a command for calculating an error between each distribution of the feature value and a predetermined probability distribution; and a command for selecting at least one hidden node among the one or more hidden nodes of the hidden layer based on the error.

According to still another exemplary embodiment of the present disclosure, a computing device for training at least a part of a neural network including a plurality of layers is disclosed. The computing device may include: one or more processors; and a memory, which stores commands executable by the one or more processors, in which the one or more processors may input training data including normal data and abnormal data to an input layer of the neural network, make a feature value output from each of one or more hidden nodes of a hidden layer of the neural network for each training data into a histogram and generate a distribution of the feature value for each of the one or more hidden nodes, calculate an error between each distribution of the feature value and a predetermined probability distribution, and select at least one hidden node among the one or more hidden nodes of the hidden layer based on the error.

Advantageous Effects

The present disclosure may provide a method of training an artificial neural network.

DETAILED DESCRIPTION

Figure 1:
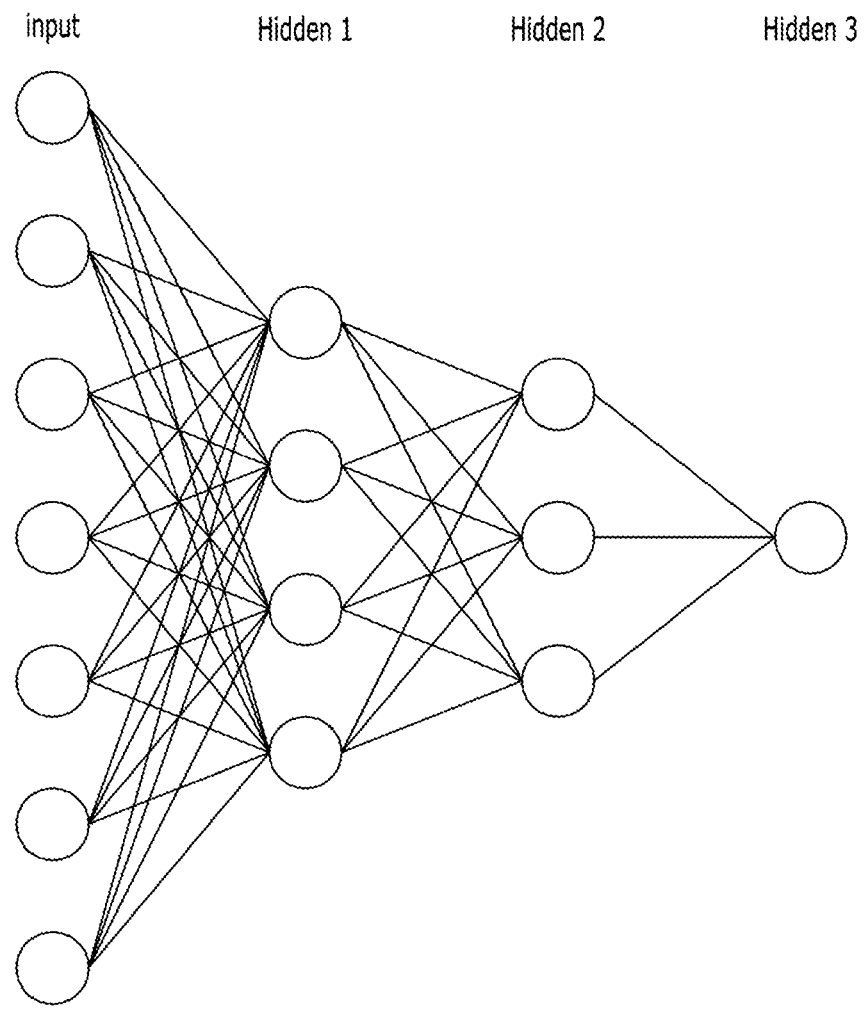
FIG. 1 is a schematic diagram illustrating a part of an artificial neural network according to an exemplary embodiment of the present disclosure.

Various exemplary embodiments will be described with reference to the drawings, and throughout the entire drawings, a similar reference numeral is used for indicating a similar constituent element. In the present specification, various descriptions are presented for understanding the present disclosure. However, it is apparent that the exemplary embodiments may be carried out even without the particular description. In other examples, publicly known structures and devices are provided in the form of a block diagram for easily describing the exemplary embodiments.

Terms, "component", "module", "system", and the like used in the present specification indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a computing device and the computing device may be components. One or more components may reside within a processor and/or an execution thread, and one component may be localized within one computer or may be distributed between two or more computers. Further, the components may be executed by various computer readable media having various data structures stored therein. For example, components may communicate through local and/or remote processing according to a signal (for example, data transmitted to another system through a network, such as Internet, through data and/or a signal from one component interacting with another component in a local system and a distributed system) having one or more data packets.

The descriptions of the presented exemplary embodiments are provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics suggested herein.

FIG. 1 is a schematic diagram illustrating a part of an artificial neural network according to an exemplary embodiment of the present disclosure.

Throughout the present specification, a nerve network, a network function, and a neural network may be used as the same meaning. The neural network may be formed of a set of connected calculation units, each of which may be generally called a "node". The "nodes" may also be referred to "neurons". The neural network includes two or more nodes. The nodes (or neurons) forming the neural networks may be connected with each other by one or more "links".

In the neural network, two or more nodes connected through the link may form a relative relationship of an input node and an output node. The concept of the input node is relative to the concept of the output node, and a predetermined node having an output node relationship with respect to one node may have an input node relationship in a relationship with another node, and a reverse relationship is also available. As described above, the relationship between the input node and the output node may be generated based on the link. One or more output nodes may be connected to one input node through a link, and a reverse case may also be valid.

In the relationship between an input node and an output node connected through one link, a value of the output node may be determined based on data input to the input node. Herein, a node connecting the input node and the output node may have a weight. A weight may be variable, and may be varied by a user or an algorithm in order to perform a function desired by a neural network. For example, when one or more input nodes are connected to one output node by links, respectively, a value of the output node may be determined based on values input to the input nodes connected with the output node and a weight set in the link corresponding to each of the input nodes.

As described above, in the neural network, two or more nodes are connected with one another through one or more links and form a relationship of an input node and an output node within the neural network. A character of the neural network may be determined according to the number of nodes and links, a relation between the nodes and the links, and a value of a weight assigned to each of the links within the neural network. For example, when there are two neural networks, which have the same number of nodes and the same number of links and have different weight values between the links, the two neural networks may be recognized to be different from each other.

As illustrated in FIG. 1, the neural network may include two or more nodes. Some of the nodes forming the neural network may form one layer based on distances from an initial input node. For example, a set of nodes having a distance of n from an initial input node may form n layers. The distance from the initial input node may be defined by the minimum number of links, which needs to be passed from the initial input node to a corresponding node. However, the definition of the layer is arbitrary for illustration and a degree of layer within the neural network may be defined by a different method from the foregoing method. For example, the layers of the nodes may be defined by a distance from a final output node.

The initial input node may mean one or more nodes, to which data is directly input without passing a link in a relationship with other nodes among the nodes within the neural network. Otherwise, the initial input node may mean nodes having no other input node connected through the links in a relationship between the nodes based on a link within the neural network. Similarly, the final output node may mean one or more nodes having no output node in the relationship with other nodes among the nodes within the neural network. Further, a hidden node may mean a node, not the initial input node and the final output node, forming the neural network. In the illustration of FIG. 1, the output node is omitted. The neural network according to an exemplary embodiment of the present disclosure may be a neural network in the form, in which the number of nodes of an input layer may be larger than the number of nodes of a hidden layer close to an output layer, and the number of nodes is decreased according to the progress from the input layer to the hidden layer.

Figure 2:
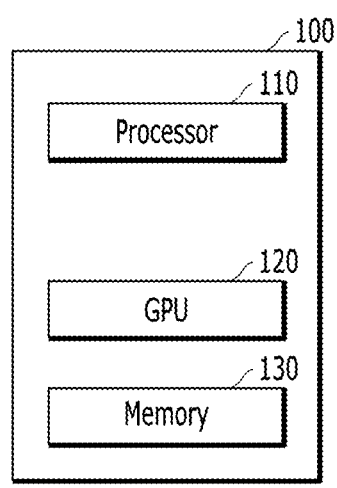
FIG. 2 is a block diagram illustrating a computing device according to an exemplary embodiment of the present disclosure.

FIG. 2 is a block diagram illustrating a computing device according to an exemplary embodiment of the present disclosure.

The computing device 100 according to the exemplary embodiment of the present disclosure may include a processor 110, a graphic processing unit (GPU) 120, and a memory 130. The block diagram of FIG. 1 illustrates a simplified configuration of the computing device, and the present disclosure is not limited thereto, and the computing device may include additional constituent elements required for driving.

The processor 110 may be one or more, and may include a central processing unit (CPU) of the computing device. The processor 110 may read a computer program stored in the memory 130 and perform a method of training an artificial neural network (ANN) and a method of classifying data by using the trained neural network according to the exemplary embodiment of the present disclosure. According to the exemplary embodiment of the present disclosure, the processor 110 or the GPU 120 may perform a calculation for training a neural network. In FIG. 2, the processor is separately illustrated from the GPU, but in the exemplary embodiment of the present disclosure, the processor may include both the CPU and the GPU, and may include predetermined processing devices for processing the neural network. The method according to the exemplary embodiment of the present disclosure may be performed by the processor.

The GPU 120 may perform a calculation, such as processing of input data for learning in deep learning (DN), extraction of a feature from input data, an error calculation, and updating of a weight of a neural network by using backpropagation, for learning of a neural network. Further, the computer program performed by the computing device according to the exemplary embodiment of the present disclosure may be a GPU-executable program. Further, although not illustrated in FIG. 1, the computing device according to the exemplary embodiment of the present disclosure may also include a tensor processing unit (TPU).

The memory 130 may store a computer program for performing the method of training the ANN and the data classification method according to the exemplary embodiment of the present disclosure, and the stored computer program may be read and driven by the processor 110, the GPU 120, and the like.

Hereinafter, the method of training the ANN and the data classification method according to the exemplary embodiment of the present disclosure will be described.

Hereinafter, terms used in the present specification will be defined.

A feature may correspond to at least one character of input data. For example, when input data is an image, the character is a gray scale histogram, color distribution, a color temperature, an edge, a shape of an edge, a combination thereof, and the like of the image, but the foregoing characters are simply illustrative, and the present disclosure is not limited thereto. The feature may correspond to at least one character of the input data, which is calculated and digitized by at least a part of a network function. For example, it is assumed that there is a character (for example, in the case of an examination of a defect of leather, marks in the leather and contamination of a different color from that of a surrounding area) representing a defect of a product in an examination of a defective product. The feature may be calculated based on the input data by the network function, and may correspond to the character. The description of the character is simply illustrative, and the present disclosure is not limited thereto. The feature in the neural network may correspond to a node determined by a predetermined sub structure of the neural network based on the input data. For example, there may exist one or more nodes corresponding to characters representing marks on leather. The feature may represent a character of the input data and may include a part of the input data, an abstract of the input data, and a meaning extracted from the input data. For example, the feature may be a process to a specific node of a specific layer processing the input data. For example, the feature may be a feature having one or more values calculated by a connection relation, a weight, a bias, and the like of the neural network connected to one node in the hidden layer of the neural network.

The character is a characteristic part in data, and in the case of image data for examining a defective product like the foregoing example, a part, based on which it is possible to recognize that a product is defective, in image data may be a character. That is, marks, migration, and the like, based on which it is possible to recognize that a product is defective, in image data of a product may be the characters. The feature may correspond to one or more features and be recognized by the neural network. The character and the feature may have a relationship of one-to-one correspondence, one-to-many correspondence, many-to-one or many-to-many correspondence. That is, when marks, migration, and the like, based on which it is possible to recognize that a product is defective, in image data of a product are the characters, the feature may be a value based on the character of the data. One or more features may be related with one or more characters. In the foregoing example, the feature may be a sub structure of the neural network, by which the corresponding character is extracted from the image data. Further, the character extracted through the feature may be visually confirmed by a user and the like, like the foregoing example, and also include an abstract character, based on which data is discriminable. The character is simply illustrative, and the present disclosure is not limited thereto.

A feature map may include a feature represented on an image and be an image representing a location-specific feature on the image.

A feature value may correspond to the foregoing feature, and mean an output value obtained by processing input data by the neural network. The feature value may be a result value obtained by processing input data with a feature. For example, when a connection relationship of the neural network to a specific node included in the hidden layer of the neural network and the like mean a feature, an output of the specific node of the input data may be a feature value. The feature value may be calculated by the neural network based on each input data. The feature value may have a predetermined dimension. The feature value may be an output value obtained by processing each input data with the neural network. The feature value may exist in correspondence to each of the input data. For example, a linkage path to node 1 of hidden layer 3, a weight, a bias, and a calculation process may correspond to features, and an output value output in the corresponding node for the input data may be a feature value.

A histogram is a diagram representing frequency distribution in the form of a graph, and in the present disclosure, the histogram may mean the distribution of the feature values represented with the form of a graph. For example, the histogram may be a diagram representing frequency distribution in the form of a graph having a pillar shape, but the present disclosure is not limited thereto. A feature value is a discrete value, and a specimen having each feature value and the number of elements of input data may be presented with a histogram. The feature value for each input data may be made into a histogram and be represented as the distribution of the feature values.

The computing device according to the exemplary embodiment of the present disclosure may represent the feature values output by processing training data with the neural network with a histogram and generate distribution of the feature value, calculate an error by comparing the distribution of the feature values with a predetermined probability distribution, select a partial node of the neural network based on the error, and train the neural network in advance.

The neural network of the present disclosure may be used for classifying data. For example, the neural network of the present disclosure may be used for anomaly detection. More particularly, the neural network of the present disclosure may be used for classifying a defective product and a normal product during a production process. The training data of the present disclosure may include image data, the normal data may include an image of a normal product, and the abnormal data may include an image of a defective product. The range of the present disclosure is not limited to the processing of the image data.

According to the data classification using the neural network of the present disclosure, when the distribution of the feature values extracted from the input data has an error of a predetermined threshold value or less with a specific probability distribution, the feature outputting the corresponding feature value may be interpreted as a feature appropriate to classify the input data. In a general factory and the like, the distributions of the normal product and the defective product follow the natural probability distributions. Accordingly, when the distribution of the feature values is similar to the natural probability distribution, the corresponding feature is highly probable to be related to a significant character for classifying data. Accordingly, the computing device 100 may activate a part of the neural network or inactivate the neural network so that the corresponding feature is used for classification. When the distribution of the feature values follows a specific probability distribution, the computing device 100 according to the exemplary embodiment of the present disclosure may select the corresponding feature to be used for classification. Hereinafter, the comparison between the probability distribution and the distribution of the feature values will be described.

Figure 3A:
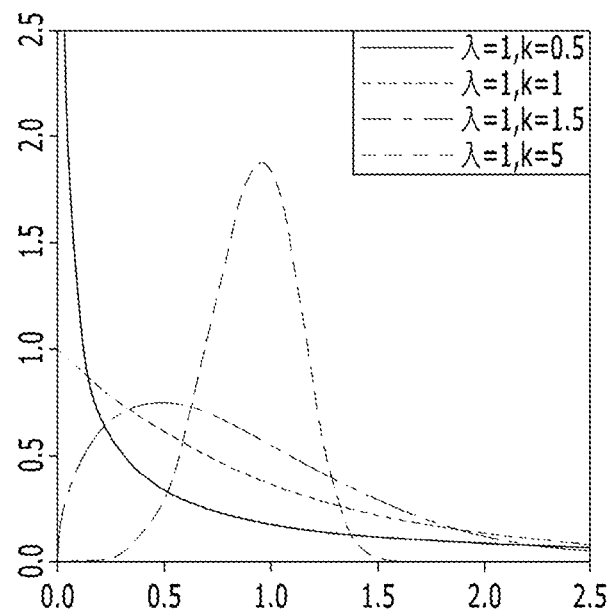
FIG. 3A is a diagram illustrating Weibull distribution.

FIG. 3A is a diagram illustrating Weibull distribution.

The Weibull distribution is one of a continuous probability distribution, and may be represented with various forms of a probability density function according to a parameter. The Weibull distribution may have various forms of a probability density function according to changes in values of parameters λ and k. The Weibull distribution may represent most of the probability distributions according to a change in a parameter, and the Weibull distribution illustrated in FIG. 3A is simply illustrative, and the probability distribution according to the exemplary embodiment of the present disclosure may include a multi-dimensional probability distribution. In another exemplary embodiment, a probability distribution of data according to the exemplary embodiment may also be based on a historical statistical value of analyzed data.

It is assumed that the distribution of the feature values has a shape, such as a graph of y=a, not a shape of the probability distribution. The input data is output with each feature value, so that when the distribution of the feature values has the foregoing shape, the corresponding feature is a feature extracting a character, which each of the input data evenly has. However, even though the character, which each of the input data evenly has, is extracted, the extracted character is not helpful to classify the input data.

However, when the distribution of the feature values extracted from the input data has a shape of the predetermined probability distribution, the corresponding feature is the extracted character, which a part of the input data has or a large part of the input data has, and the feature may be a significant feature for classifying the data.

Figure 3B:
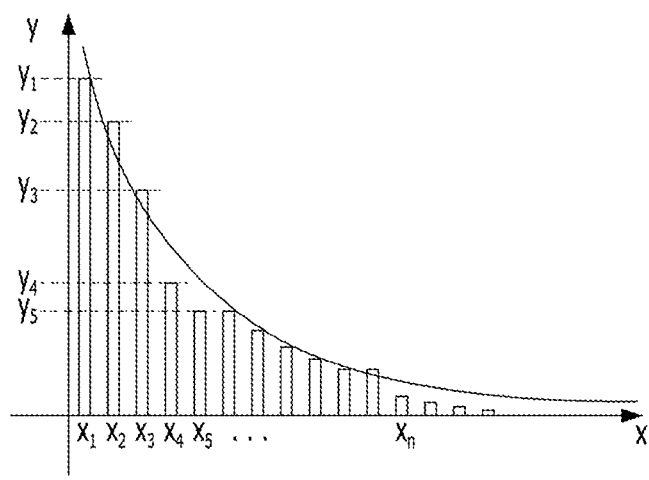
FIG. 3B is a diagram illustrating a comparison between specific Weibull distribution and distribution of feature values.

When the distribution of the feature values follows the probability distribution illustrated in FIG. 3B, the corresponding feature may be the feature extracting a character, which only a part of the input data has. The character, which only the part of the input data has, may be a significant character for classifying the input data. Accordingly, when the distribution of the feature values is similar to a specific probability distribution, the corresponding feature may be a significant character for classifying the input data, and the computing device 100 according to the exemplary embodiment of the present disclosure may activate or inactivate the node of the neural network so as to select the corresponding feature.

Accordingly, the neural network according to the exemplary embodiment of the present disclosure, when the distribution of the feature values output from the hidden node of the hidden layer is similar to a predetermined probability distribution function, the corresponding feature (that is, the corresponding node of the neural network) may be the significant feature for classification, and the node outputting the corresponding feature value may be the node outputting the significant feature in the classification of the data. The determination of the similarity between the distribution of the feature values and the predetermined probability distribution function will be described below. Accordingly, the neural network may be reconfigured by activating only the node outputting the significant feature or by extracting nodes outputting the significant features in the plurality of neural networks. The neural network reconfigured by the scheme may have high accuracy in the classification of the data, and the neural network may be configured with the nodes, which are capable of extracting the significant features, before the training, to decrease the number of times of repetition of the training and decrease the amount of calculation, and improve training efficiency.

The predetermined probability distribution is the continuous function and the histogram is the discrete distribution, so that the computing device 100 according to the exemplary embodiment of the present disclosure may determine an error between the predetermined probability distribution and the distribution of the feature values. FIG. 3B is a diagram illustrating an example of the determination of similarity between a predetermined probability distribution and the distribution of feature values. In the example of FIG. 3B, a curve representing a continuous probability distribution may represent Weibull distribution, in which parameters $\lambda=1$ and $k=0.5$. In the example of FIG. 3B, bar graph shape portions may represent the distribution of the feature values. In the example of FIG. 3B, an x-axis represents a feature value and a y-axis represents the number of specimens (that is, the input data) based on a feature value. The x-axis and the y-axis may be normalized for comparison with the probability distribution curve (that is, because the probability distribution curve may have a value of $0<y<1$. That is, the computing device 100 may normalize the values corresponding to the respective axes of the distribution of the feature values and easily compare the distribution of the feature values with the predetermined probability distribution. In the example of FIG. 3B, the corresponding feature shows a tendency in that the number of elements of the input data having a value $x_1$ is largest, and the number of elements of the input data having the corresponding value is decreased from a value $x_2$ to a value $x_1$. The computing device 100 according to the exemplary embodiment of the present disclosure may determine an error between the distribution of the feature values and the predetermined probability distribution. In the distribution of the feature values like the example illustrated in FIG. 3B, the computing device 100 may compare the number of elements of the input data of each feature value (or the normalized value of the number of elements of the input data) with a predetermined probability distribution value at each point. For example, in the example of FIG. 3B, the computing device 100 may compare $(x_1, y_1)$ with one or more points (a value of y in the graph corresponding to $x_1$) of the predetermined probability distribution graph and compare the predetermined probability distribution and the distribution of the feature values. For example, the distribution between the value of the normalized histogram and the corresponding probability distribution value may be used as a comparison reference.

In another exemplary embodiment, the computing device 100 may determine similarity between the distribution of the feature values and the predetermined probability distribution based on whether the distribution of the feature values shows the similar tendency to that of a specific probability distribution. For example, a difference between a differential value of a normalized histogram and a differential value of a corresponding probability distribution may be used as a comparison reference. When the distribution of the feature values shows a decreasing tendency like the example of FIG. 3B, that is, when $x_1<x_2<x_3<x_4<x_5$, the distribution of the feature values shows the tendency of $y_1>y_2>y_3>y_4>y_5$, the computing device 100 may determine that the distribution of the corresponding feature value is similar to the Weibull distribution, in which parameters $\lambda=1$ and $k=0.5$. That is, the computing device 100 according to the exemplary embodiment of the present disclosure may determine the similarity and an error between the predetermined probability distribution and the distribution of the feature values based on whether the feature values and the number of elements of the input data included in each feature value in the distribution of the feature values show the similar tendency to that of the predetermined probability distribution. When the error is equal to or smaller than the predetermined threshold value, the computing device 100 may determine that the predetermined probability distribution is similar to the distribution of the feature values. The foregoing description is simply illustrative, and the probability distribution, the shape of the distribution of the feature values, and the similarity determination method of the present disclosure are not limited thereto.

The computing device 100 according to the exemplary embodiment of the present disclosure may input training data including normal data and abnormal data to the input layer of the neural network for training the ANN. The training data according to the exemplary embodiment of the present disclosure may be non-labelled data.

The computing device 100 according to the exemplary embodiment of the present disclosure may calculate the training data input from the input layer and output an output value, and transfer the output value of the input layer to the hidden layer to make the hidden layer output a feature value.

Figure 4:
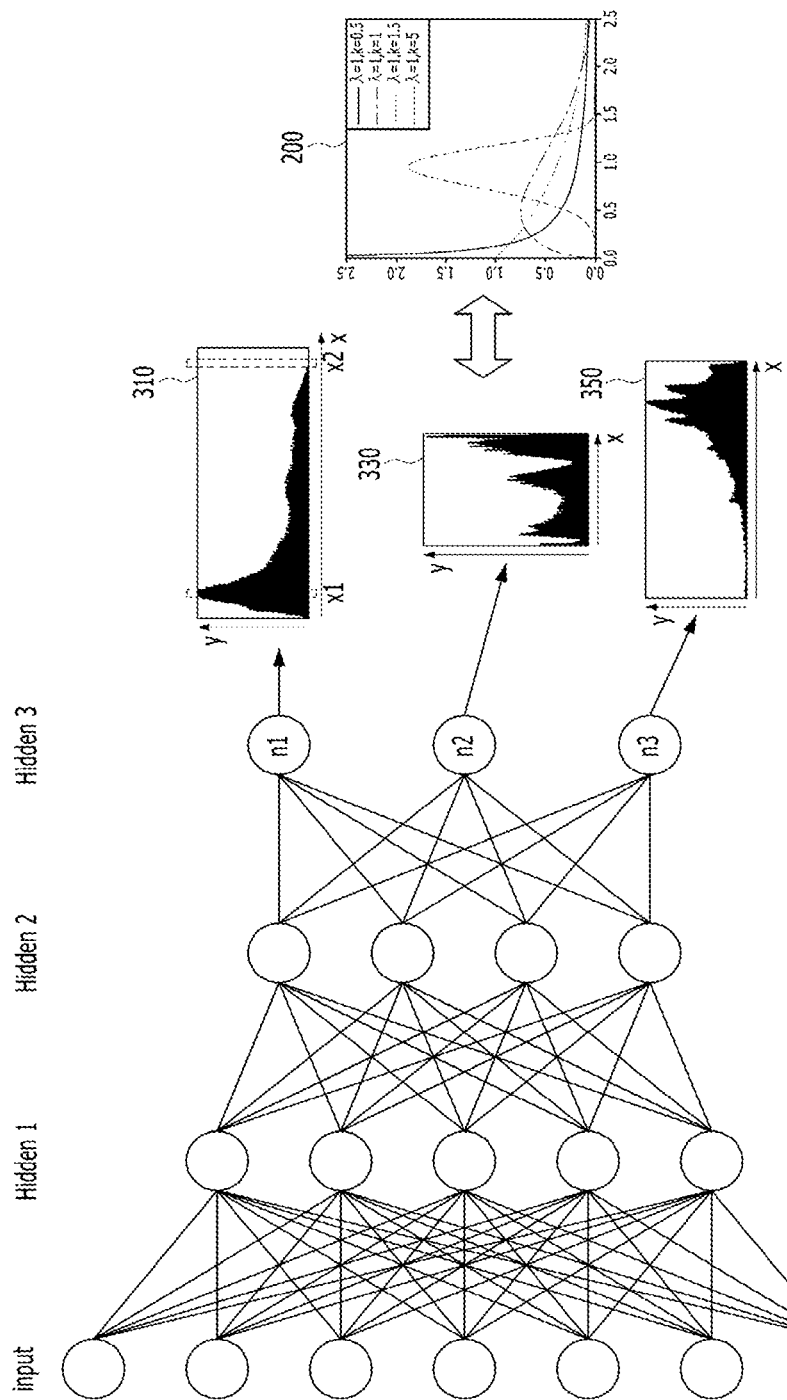
FIG. 4 is a diagram of a comparison between a histogram of values of features extracted from input data and Weibull distribution according to the exemplary embodiment of the present disclosure.

FIG. 4 is a diagram illustrating an example of a part of the ANN according to the exemplary embodiment of the present disclosure. The neural network according to the exemplary embodiment of the present disclosure may include at least three layers of hidden layer. The number of layers and the number of nodes of the neural network illustrated in FIG. 4 are simply illustrative, and the present disclosure is not limited thereto. The ANN according to the exemplary embodiment of the present disclosure may include a convolutional neural network (CNN), an auto encoder, a feedforward neural network, a radial basis function network, a kohonen self-organizing network, a recurrent neural network (RNN), and the like, but the present disclosure is not limited thereto and the ANN may include a predetermined neural network.

The computing device 100 according to the exemplary embodiment of the present disclosure may make the feature value output from the hidden node of the hidden layer of the neural network for each training data into a histogram and generate the distribution of the feature values. The hidden layer may be the layer before the output layer of the neural network. Referring to FIG. 4, a node linkage route to node n1 of hidden layer 3 and a set of values of one group calculated by a weight may be features. The feature value is a result obtained by processing the training data by each node of each layer, and may include a predetermined character, such as contrast of an image, brightness of the image, color distribution, an edge of the image, and an image histogram, but the present disclosure is not limited thereto, and the feature value may also include an abstract character. In the example of FIG. 4, hidden layer 3 may extract three features (calculation processes to nodes n1, n2, and n3), and each node of hidden layer 3 may output a feature value for each training data.

In the example of FIG. 4, a first feature value (a calculation result of the input data for a first feature) of an output of node n1 of hidden layer 3 may be made into a histogram and be output as a first feature value distribution 310. The computing device 100 may make the output values of each input data in node n1 into a histogram and generate the first feature value distribution 310.

Herein, the first feature value distribution 310 is generated by making the feature value (the output in node n1) for each input data into the histogram, and an x-axis represents the feature value and a y-axis represents the number of specimens in a corresponding feature value. One feature value may be output for one element of input data, and the one output feature value may be one specimen in the histogram. The first feature value distribution is generated by making the feature value for each of the plurality of elements of input data into the histogram. As described above, an output for each of the input data in node $n_2$ of hidden layer 3 may be a second feature value distribution 330, and an output for each of the input data in node $n_3$ of hidden layer 3 may be a third feature value distribution 350.

The computing device 100 according to the exemplary embodiment of the present disclosure may calculate an error between the distribution of the feature values and the predetermined probability distribution. The predetermined probability distribution may include the Weibull distribution. The Weibull distribution 200 is one of the continuous probability distribution as illustrated in FIG. 3A, and may represent various probability density function forms according to a parameter. The Weibull distribution may have various forms of a probability density function according to changes in values of parameters λ and k. As illustrated in FIG. 3A, the distribution of the probability density function may have various forms according to each parameter. Herein, the parameter of the Weibull distribution may be randomly determined, and may be determined so as to have an appropriate shape according to a generally known defective rate. The foregoing Weibull distribution is simply illustrative, and the probability distribution of the present disclosure may include an n-dimensional probability distribution.

The computing device 100 may calculate errors between the distributions 310, 330, and 350 of the feature values and a predetermined probability distribution 200. The computing device 100 may compare the distributions 310, 330, and 350 of the feature values with the predetermined Weibull distribution and calculate errors. In the example of FIG. 4, the first feature value distribution 310 relatively shows the similar histogram to the form of the graph of the probability distribution, and shows an aspect in which the feature values are not evenly distributed in several values, and are concentrated to some values. More particularly, in the shape of the first feature value distribution 310, most of the feature values are concentrated in some regions, and are scarcely present at an end portion (a lower end portion in the first feature value distribution 310 in the drawing) of the value in the x-axis. Accordingly, based on the shape, the first feature, based on which the first feature value is extracted, is determined as a significant feature appropriate for dividing the feature, which most of the input data have, and the feature, which the most of the input data does not have. Based on the shape of the first feature value distribution 310, there is a feature value, in which many specimens are present (point $x_1$ having the largest value in the y-axis in reference numeral 310 of FIG. 4), and there is a feature value, in which small specimens are present (point $x_2$ having a small value in the y-axis in reference numeral 310 of FIG. 4). It can be seen that the feature value for each of the input data corresponding to feature n1 has a value of $x_1$ most, and has a value of $x_2$ least. This represents that the number of elements of the input data, in which the feature value of $x_1$ is output, is large, and the number of elements of the input data, in which the feature value of $x_2$ is output, is small. Accordingly, feature n1 may be the feature, which extracts $x_1$ as a feature value in most of the input data for the plurality of input data (in general, the normal data is larger than the abnormal data), and extracts $x_2$ as a feature value in some of the input data. The first feature value distribution 310 extracted through feature n1 may have the shape of the Weibull distribution (the shape similar to a solid line in the Weibull distribution 200), in which the number of specimens is concentrated to some feature values. The computing device 100 may calculate an error between the first feature value distribution 310 and the predetermined Weibull distribution 200 (the solid line), and when the error is equal to or less than a predetermined value, the computing device 100 may activate the node outputting the first feature value (in this case, node n1 in the example of FIG. 4).

Identically, a second feature value for each input data may be output in node n2 of hidden layer 3, and the computing device 100 may generate the second feature value distribution 330. The second feature value distribution 330 has a shape, in which the specimen is not concentrated to a specific feature value, but the number of specimens is evenly distributed in general. In this case, the second feature may be estimated to be a feature extracting a feature, which most of the images have. In the second feature value distribution 330, there is no feature value, which distinctly has larger specimens than those of other feature values, and this may mean that a character extracted by the second feature is a feature, which the input data may generally have. The computing device 100 may calculate an error between the second feature value distribution 330 and the predetermined Weibull distribution. In this case, the error between the second feature value distribution 330 and the predetermined Weibull distribution may be larger than the error between the first feature value distribution 310 and the predetermined Weibull distribution. Accordingly, when the error between the second feature value distribution 330 and the predetermined Weibull distribution is larger than a predetermined value (that is, a threshold value), the computing device 100 may determine the second feature as an unnecessary feature in classifying the input data. Accordingly, the computing device 100 may inactivate the node outputting the second feature value (in this case, node n2 in the example of FIG. 4).

By the same scheme, the distribution of the feature values output from node n3 of hidden layer 3 also has a shape, in which the specimens are slightly concentrated to a specific feature value. The computing device 100 may calculate an error between the third feature value distribution 330 and the predetermined Weibull distribution 200, and when the error is equal to or less than a predetermined value, the computing device 100 may activate node n3 outputting the third feature value.

The activation and the inactivation of the node may be performed by adjusting the weight connecting the corresponding node and a next node. For example, the computing device 100 may adjust a linkage weight between a node of the output layer connected with node n1 and node n1 to 1 so that the output of selected node n1 is fully transferred to the output layer. Further, for example, the computing device 100 may adjust a linkage weight between a node of the output layer connected with node n2 and node n2 to 0 so that the output of inactivated node n2 is not transferred to the output layer. The linkage weight is simply illustrative, and the present disclosure is not limited thereto. The computing device 100 may set an appropriate linkage weight so that an output of an inactivated node is not transferred to a next layer, and may set an appropriate linkage weight so that an output of an activated node is transferred to a next layer.

The computing device 100 according to the exemplary embodiment of the present disclosure may normalize a feature value output from a hidden layer. In the example of FIG. 4, in each feature value distribution, the ranges of the feature values (the x-axes of the feature value distributions 310, 330, and 350) may be different from one another. Accordingly, the computing device 100 may normalize the feature values and adjust the x-axes of the feature value distributions to be the same in order to easily compare each of the feature value distributions with the predetermined probability distribution.

Figure 5:
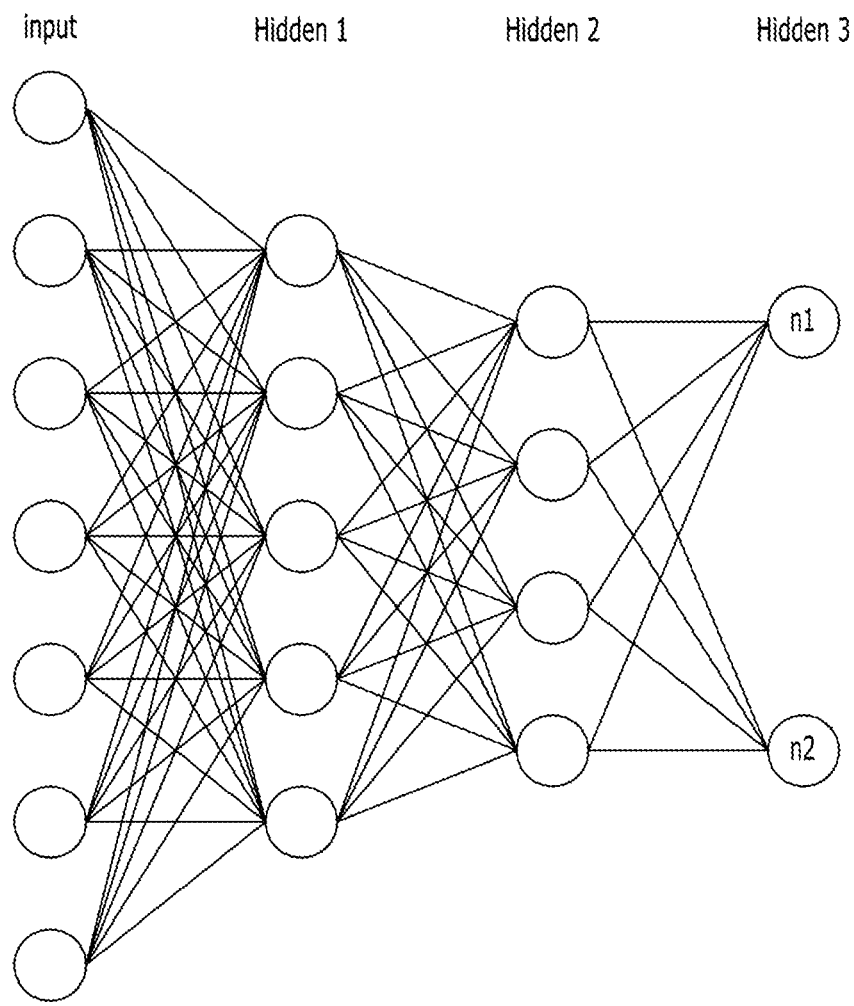
FIG. 5 is a diagram illustrating a selection of nodes of at least a part of hidden layers according to the exemplary embodiment of the present disclosure.

FIG. 5 is a diagram illustrating the neural network, in which nodes n1 and n3 of hidden layer 3 are selected and n2 is inactivated, in the example of FIG. 4. The computing device 100 may select nodes n1 and n3 and adjust a weight of each of the nodes so that the output of the corresponding node is transferred to a next layer. The computing device 100 may inactivate node n2 and adjust a weight of node n2 so that the output of the corresponding node is not transferred to a next layer.

Figure 6:
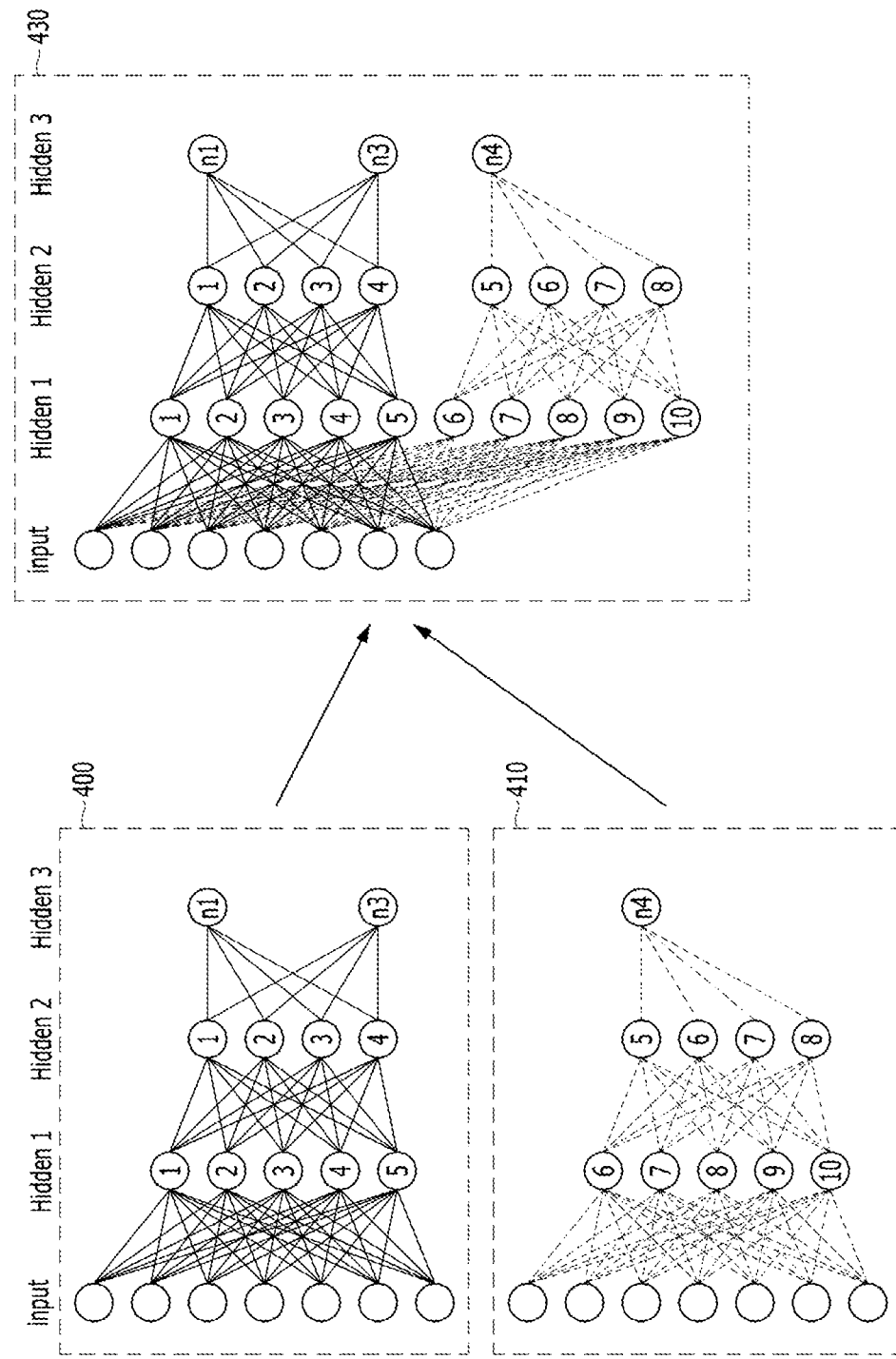
FIG. 6 is a diagram illustrating an ensemble of nodes selected from a plurality of neural networks according to the exemplary embodiment of the present disclosure.

FIG. 6 is a diagram illustrating an example of the case where the computing device makes an ensemble of a plurality of neural networks and forms a neural network.

The comparison between the distribution of the feature values and the predetermined probability distribution and the inactivation of a part of the neural network according to the comparison of the present disclosure may be performed on each of the plurality of neural networks.

For example, in an example of FIG. 6, in a first neural network 400, nodes n1 and n3 of hidden layer 3 are activated, and node n2 is inactivated, and in a second neural network 410, node n4 of hidden layer 3 are activated, and other nodes are inactivated.

In this case, the computing device 100 may make an ensemble of the first neural network 400 and the second neural network 410 and form a third neural network 430.

For example, node n4 of the second neural network 410 may receive inputs from nodes 4, 5, 6, and 7 of hidden layer 2, and nodes 4, 5, 6, and 7 of hidden layer 2 may receive inputs from nodes 6, 7, 8, 9, and 10 of hidden layer 1. The linkage relation is also maintained in the third neural network 430.

When the prior training method according to the exemplary embodiment of the present disclosure is applied to the plurality of neural networks in parallel, it is possible to simplify a network structure in a prior training operation, thereby decreasing the amount of calculation, and a sensitivity test is easy, thereby enabling a researcher to better understand a network internal structure (for example, in the case where the prior training method of the present disclosure is performed through the two combined networks, based on FIG. 6 as the example, five nodes are increased to ten nodes in hidden layer 1 and four nodes are increased to eighth nodes in hidden layer 2, so that the entire amount of calculation is increased and a sensitivity test is not easy).

The ensemble scheme described in FIG. 6 is simply illustrative, and the range of the present disclosure may include various ensemble schemes.

In normal data obtained by photographing a normal product and abnormal data obtained by photographing an abnormal product, the normal data is more obtained than the abnormal data in general, and there is a problem in that it is difficult to obtain the sufficient number of elements of the abnormal data. It is difficult to obtain the sufficient number of elements of the abnormal data for learning, and various data augmentation techniques are used in order to increase data for obtaining the sufficient number of elements of the abnormal data for learning. However, according to the exemplary embodiment of the present disclosure, when the neural network is adjusted in advance so that the distribution of the feature values output in the neural network uses only similar features (significant features) to those of the predetermined probability distribution, the neural network is formed of the significant features (that is, the significant nodes) prior to the training, thereby decreasing the number of times of the repetition of the training and the amount of calculation and improving training efficiency. In this case, the training is possible even with the training data, which is not labelled, and it is possible to process more data by an unsupervised training scheme, thereby improving accuracy.

The method of training the neural network according to the exemplary embodiment of the present disclosure may be performed before the repetitive learning of the neural network, such as back propagation. The method of training the neural network according to the exemplary embodiment of the present disclosure may compare a distribution of feature values extracted from each node of the neural network with a predetermined probability distribution, activate only a node (feature) extracting only feature values, of which the distribution is meaningful in the aspect of the probability distribution, and include only the node extracting only the significant feature in the neural network. When the method of training the neural network according to the exemplary embodiment of the present disclosure is used, the neural network formed of only the nodes extracting the significant features is determined before the repetitive learning, thereby improving efficiency in a later repetitive learning and improving classification accuracy.

Figure 7:
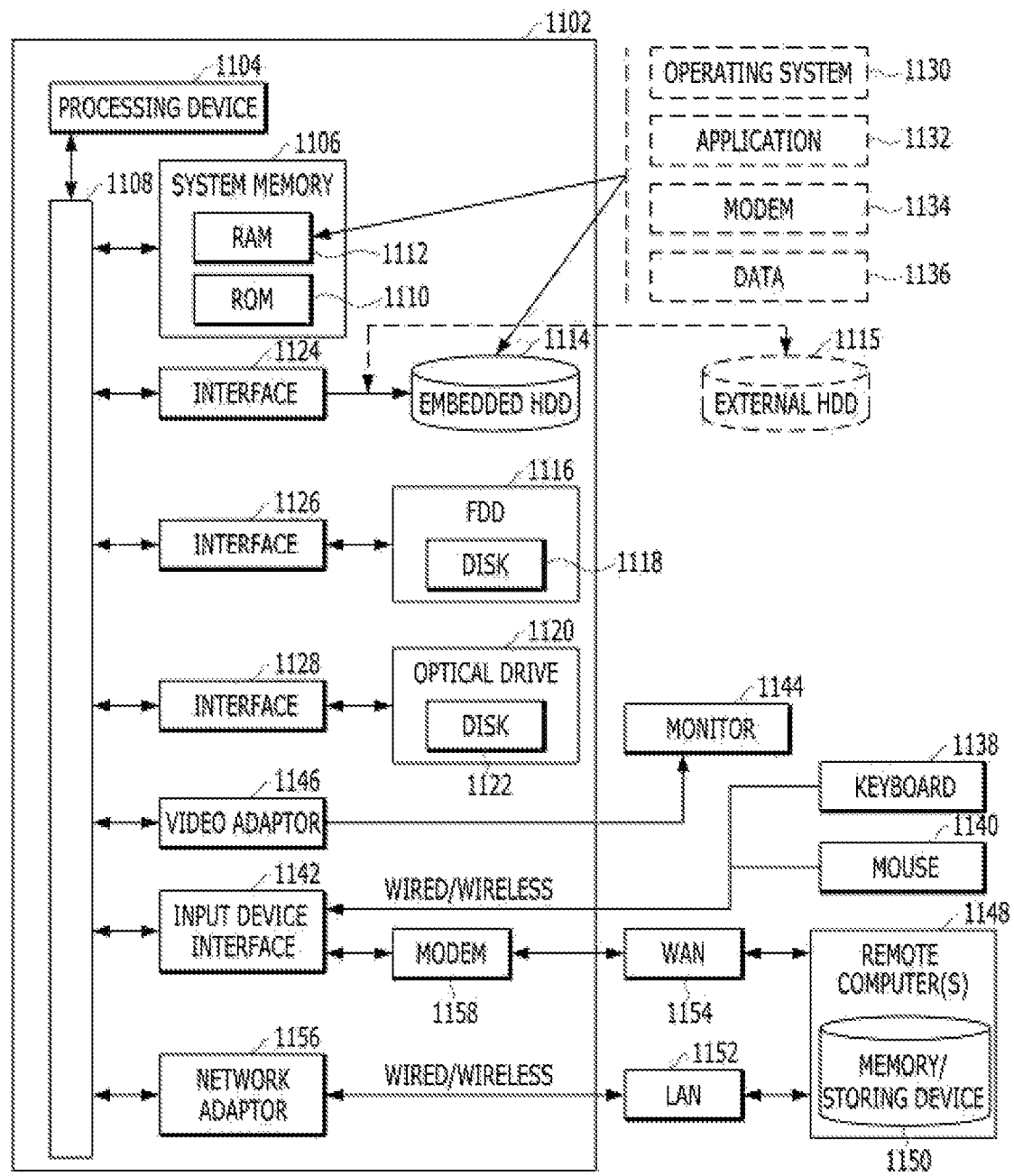
FIG. 7 is a block diagram illustrating a computing device according to an exemplary embodiment of the present disclosure.

FIG. 7 is a block diagram illustrating a computing device according to an exemplary embodiment of the present disclosure.

FIG. 7 is a simple and general schematic diagram illustrating an example of a computing environment, in which the exemplary embodiments of the present disclosure may be implemented.

The present disclosure has been generally described in relation to a computer executable command executable in one or more computers, but those skilled in the art will appreciate well that the present disclosure is combined with other program modules and/or be implemented by a combination of hardware and software.

In general, a program module includes a routine, a program, a component, a data structure, and the like performing a specific task or implementing a specific abstract data type. Further, those skilled in the art will appreciate well that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The exemplary embodiments of the present disclosure may be carried out in a distribution computing environment, in which certain tasks are performed by remote processing devices connected through a communication network. In the distribution computing environment, a program module may be positioned in both a local memory storage device and a remote memory storage device.

The computer generally includes various computer readable media. A computer accessible medium may be a computer readable medium regardless of the kind of medium, and the computer readable medium includes volatile and non-volatile media, transitory and non-non-transitory media, portable and non-portable media. As a non-limited example, the computer readable medium may include a computer readable storage medium and a computer readable transport medium. The computer readable storage medium includes volatile and non-volatile media, transitory and non-non-transitory media, portable and non-portable media constructed by a predetermined method or technology, which stores information, such as a computer readable command, a data structure, a program module, or other data. The computer storage medium includes a read only memory (RAM), a read only memory (ROM), electrically erasable and programmable ROM (EEPROM), a flash memory, or other memory technologies, a compact disc (CD)-ROM, a digital video disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally includes all of the information transport media, such as a carrier wave or other transport mechanisms, which implement a computer readable command, a data structure, a program module, or other data in a modulated data signal. The term of the "modulated data signal" means a signal, of which one or more of the characteristics are set or changed so as to encode information within the signal. As a non-limited example, the computer readable transport medium includes a wired medium, such as a wired network or a direct-wired connection, and a wireless medium, such as sound, radio frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various common processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an erasable and programmable ROM (EPROM), and an EEPROM, and the BIOS includes a basic routine helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 114 being configured for outer mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of predetermined data in an appropriate digital form. In the description of the computer readable storage media, the HDD, the portable magnetic disk, and the portable optical media, such as a CD, or a DVD, are mentioned, but those skilled in the art will appreciate well that other types of compute readable storage media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display device are also connected to the system bus 1108 through an interface, such as a video adapter 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a workstation, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, Internet.

When the computer 1102 is used in the LAN networking environment, the computer 1102 is connected to the local network 1152 through a wired and/or wireless communication network interface or an adapter 1156. The adapter 1156 may make wired or wireless communication to the LAN 1152 easy, and the LAN 1152 also includes a wireless access point installed therein for the communication with the wireless adapter 1156. When the computer 1102 is used in the WAN networking environment, the computer 1102 may include a modem 1158, is connected to a communication computing device on a WAN 1154, or includes other means setting communication through the WAN 1154 via the Internet and the like. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, electric fields or particles, optical fields or particles, or a predetermined combination thereof.

Those skilled in the art will appreciate that the various illustrative logical blocks, modules, processors, means, circuits, and algorithm operations described in relation to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured article" includes a computer program, a carrier, or a medium accessible from a predetermined computer-readable device. For example, the computer-readable medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be re-arranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics suggested herein.

MODE FOR CARRYING OUT THE DISCLOSURE

Related contents have been described in the best mode for carrying out the disclosure.

INDUSTRIAL APPLICABILITY

The present disclosure may be used for training an artificial neural network utilized in a field, in which input data is discriminated by using a computing device.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of training at least a part of a neural network including a plurality of layers, the method being performed by a computing device, the method comprising:
   inputting training data including normal data and abnormal data to an input layer of the neural network;
   making a feature value output from each of one or more hidden nodes of a hidden layer of the neural network for each training data into a histogram and generating a distribution of the feature value for each of the one or more hidden nodes;
   calculating an error between each distribution of the feature value and a predetermined probability distribution; and
   updating a weight of at least one hidden node to deactivate the at least one hidden node of the one or more hidden nodes of the hidden layer based on the error.

2. The method of claim 1, wherein an initial weight of the neural network including the plurality of layers is randomly determined.

3. The method of claim 1, wherein the selecting of at least one hidden node among the one or more hidden nodes of the hidden layer based on the error includes:
   selecting a hidden node, in which the error is equal to or smaller than a predetermined value, among the one or more hidden nodes of the hidden layer.

4. The method of claim 1, wherein the neural network includes at least three layers of the hidden layer.

5. The method of claim 1, wherein the training data does not include labelling and the training method is an unsupervised training method.

6. The method of claim 1, wherein the predetermined probability distribution is a Weibull distribution, in which a parameter is randomly determined.

7. The method of claim 1, further comprising:
   normalizing the feature value output from the hidden layer.

8. The method of claim 1, further comprising:
   inputting the training data to an input layer of each of a plurality of neural networks.

9. The method of claim 8, further comprising:
   reconfiguring the neural network by making an ensemble of one or more nodes selected from the plurality of neural networks.

10. A computer program stored in a non-transitory computer readable storage medium, the computer program including a plurality of commands executed by one or more processors of a computing device, the computer program comprising:
    a command for inputting training data including normal data and abnormal data to an input layer of a neural network;
    a command for making a feature value output from each of one or more hidden nodes of a hidden layer of the neural network for each training data into a histogram and generating a distribution of the feature value for each of the one or more hidden nodes;
    a command for calculating an error between each distribution of the feature value and a predetermined probability distribution; and
    a command for updating a weight of at least one hidden node to deactivate the at least one hidden node of the one or more hidden nodes of the hidden layer based on the error.

11. A computing device for training at least a part of a neural network including a plurality of layers, the computing device comprising:
    one or more processors; and
    a memory, which stores commands executable by the one or more processors,
    wherein the one or more processors input training data including normal data and abnormal data to an input layer of the neural network, make a feature value output from each of one or more hidden nodes of a hidden layer of the neural network for each training data into a histogram and generate a distribution of the feature value for each of the one or more hidden nodes, calculate an error between each distribution of the feature value and a predetermined probability distribution, and update a weight of at least one hidden node to deactivate the at least one hidden node of the one or more hidden nodes of the hidden layer based on the error.

* * * * *